Dec. 22, 1953
C. W. CAIRNES
2,663,198
ANTIBACKLASH GEARING
Filed Oct. 15, 1952
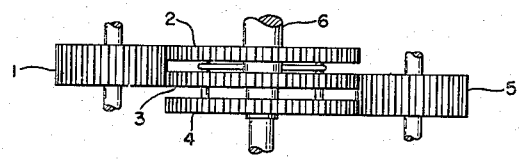
Fig. 1
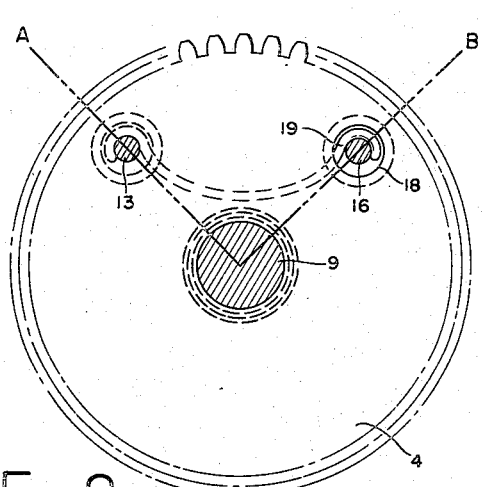
Fig. 2
Fig. 3
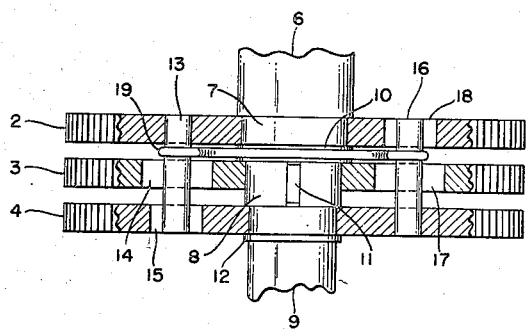
Fig. 5
Fig. 4
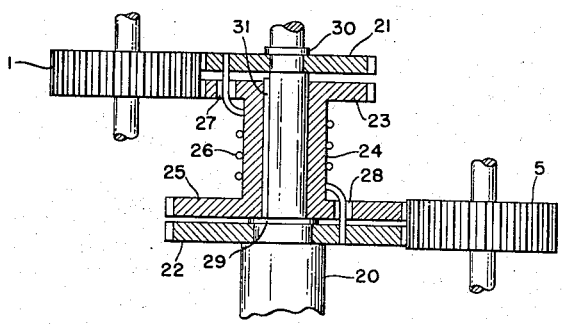
CHARLES W. CAIRNES
*INVENTOR.*
BY
*Killman, Kerst and Pfund*
ATTORNEYS Patented Dec. 22, 1953

2,663,198

UNITED STATES PATENT OFFICE 2,663,198

ANTIBACKLASH GEARING

Charles W. Cairnes, Baltimore, Md., assignor to Bendix Aviation Corporation, Towson, Md., a corporation of Delaware Application October 15, 1952, Serial No. 314,860

5 Claims. (Cl. 74—409)

This invention relates to the prevention of backlash in a train of gears.

Many arrangements for accomplishing this result have been proposed. Among these are a class of devices in which a pair of gears are arranged side-by-side, one of the gears being secured to the shaft and the other floating, with a spring means interacting with both gears to provide a rotational bias between them. A single gear meshes with the biased pair.

While such schemes are effective in eliminating backlash between a pair of meshing gears, they require an excessive number of gears for an extended train since each mesh must include a pair of the side-by-side gears. To use one of the side-by-side pairs for two meshes would result in relieving backlash with only one of the cooperating gears. This would be the one with the least amount of tooth wear.

It is an object of this invention to reduce the number of gears required for eliminating backlash in a multiply meshed gear train.

It is another object of the invention to provide an anti-backlash arrangement in which only one extra gear is required for each pair of meshes in a multiply meshed gear train.

It is a further object of the invention to provide means for accomplishing the above results without any reduction in the effectiveness of the mechanism in preventing backlash, either initially or after a considerable amount of tooth wear.

These and other objects and advantages of the invention are attained by an arrangement for use with two successive meshes, which employs for the intermediate gearing, three gears mounted in side-by-side relationship, one of which may be fixed to the shaft and the other two floating thereon. A pin extends from each of the side gears through holes in the other two gears, the holes being of larger diameter than the pin and those in the intermediate gear being larger than those in the outside gears. A spring member acts on the pins to bias the assembly.

In the drawing:

Fig. 1 is an elevational view of a train of gears embodying the invention;

Fig. 2 is a plan view of the intermediate gear assembly of the train of Fig. 1;

Fig. 3 is a view similar to Fig. 2 with a portion of the outside gear broken away;

Fig. 4 is an elevational view of the intermediate gear assembly with a section bounded by the lines A—B of Fig. 2 removed; and Fig. 5 is an elevational view of another form of the invention from which a mechanical advantage may be obtained. The intermediate gear assembly is shown in cross-section.

Referring now more particularly to the drawing, there is shown in Fig. 1 a gear train comprising a gear 1 which may be considered, by way of example, as being a driving gear; an intermediate assembly of gears comprising gears 2, 3 and 4 and driven gear 5. The gears 2, 3 and 4 are mounted in side-by-side relationship upon a shaft 6. The gear 1 meshes with intermediate gears 2 and 3, while the gear 5 meshes with intermediate gears 3 and 4.

The detailed construction of the intermediate gear assembly is more clearly shown in Figs. 2, 3 and 4. It will be noted from Fig. 4 that the shaft 6 has several stepped portions 7, 8 and 9 upon which the three gears are assembled in spaced relationship. The gear 2 is held in place on the stepped portion 7 by a collar 10. The gear 3 is held in place on the stepped portion 8 by a key 11 and the gear 4 is held in place on the stepped portion 9 by a collar 12. Each of the gears is held against the shoulder which marks the boundary between the stepped portion of the shaft on which it is located and the next larger portion of the shaft. While the gear 3 is shown as keyed, this is by way of example only, as any one of the three gears may be fixed or keyed to the shaft, the other two being mounted for free rotation about the shaft.

Extending downwardly from the gear 2 is a pin 13. This pin extends through a hole 14 formed in the gear 3 and a hole 15 formed in the gear 4, the hole 14 being larger than 15. Extending upwardly from gear 4 is a pin 16. This pin passes through a hole 17 in gear 3 and a hole 18 in gear 2, the hole 17 being larger than 18. The spacing of these pins is not diametrical but is as shown in Figs. 2 and 3.

A bowed spring member 19 is fitted between the pins 13 and 16 with its ends being of hooked shape and extending partially around the respective pins. The spring as shown is of a compressive type urging the two pins away from each other. The spring is shown as located between the two coils 2 and 3 but would function in the same manner if positioned between the gears 3 and 4. If desired, two springs could be used, one between the members of each pair of the intermediate gears. It should also be understood that while a compressive type of spring has been shown, a retractive type could be used, if desired, and would accomplish the same results.

In the operation of the device the gear train is meshed as shown in Fig. 1. The action of the spring 19 will bias the intermediate gears so that corresponding teeth of the gears 2 and 3 are urged in opposite directions against the opposite faces of the meshing teeth of gear 1 and the teeth of the gears 3 and 4 are biased in a similar manner against the teeth of the gear 5. The limits of this biasing action are set by the difference in size between the pins 13 and 16 and the holes 15 and 18 through which they pass. These limits may be set to be greater than any foreseen play in the gear train. The key 11 is necessary only if power is to be taken from shaft 6. Otherwise, all three intermediate gears may rotate freely on the shaft.

It can be seen that since the biasing action occurs between the outside gears 2 and 4 of the intermediate assembly, the biasing action completely compensates for the total backlash which would otherwise be present in the whole system. This effect is accomplished by the introduction of only one extra gear, namely gear 3, over a conventional gear train with no anti-backlash mechanism. This is in contrast to other anti-backlash arrangements of the prior art which require an extra gear for each pair of meshing gears of the train.

The form of the invention shown in Figs. 1 to 4, inclusive, is suitable for use when the intermediate gear assembly is to be used as an idler gear. Fig. 5 shows a form of invention suitable for use in cases in which a mechanical advantage is to be derived from the gear train. In this form of the invention the intermediate gear assembly comprises, as before, three gears mounted in spaced side-by-side relation on the shaft 20. The outside gears 21 and 22 are of different diameters. The central gear is a gear cluster comprising the toothed portion 23 integrally connected by a cylindrical portion 24 to a larger toothed portion 25. The toothed portion 23 has the diameter of the gear 21, while the portion 25 has the same diameter as the gear 22. Wrapped around the cylindrical portion is a torsional spring 26 of coil form having one of its ends extended in parallelism with the axis of shaft 20 through a hole 27 formed in toothed portion 23 and into the gear 21 where it is fixed. The other end of the spring extends parallel to the axis of shaft 20 through a hole 28 formed in the toothed portion 25 and into the gear 22 where it is fixed. The holes 27 and 28 are of considerably larger diameter than that of the portion of the spring which extends through them.

The spacing of the intermediate gears is achieved by mounting them upon stepped portions of the shaft 20 and by the use of collar 29 between the central gear and gear 22, and collar 30 abutting the gear 21. A key 31 secures the central gear cluster to the shaft.

The operation of this form of the invention is same as that of the preceding figures, the only difference in the result being the attainment of a mechanical advantage from the gear train. The key 31 may be omitted if power is not to be taken from the shaft 20.

What is claimed is:

1. A train of gears comprising a first gear, an intermediate gear assembly and a final gear, said intermediate gear assembly comprising a shaft, three gears, means mounting said three gears on said shaft in spaced side-by-side relation, said first gear meshing with the central gear and one of the outside gears of said intermediate gear assembly, said final gear meshing with the central and the other outside gear of said intermediate gear assembly, a pin extending from each of said outside gears through openings formed in the remaining gears of said intermediate gear assembly, the holes in the central gear being larger than the others, and spring biasing means interconnecting said pins.

2. A train of gears comprising a first gear, an intermediate gear assembly and a final gear, said intermediate gear assembly comprising a shaft, three gears, means mounting said three gears on said shaft in spaced side-by-side relation, said first gear meshing with the central gear and one of the outside gears of said intermediate gear assembly, said final gear meshing with the central and the other outside gear of said intermediate gear assembly, and spring means connected between the two outside gears of said intermediate gear assembly and exerting a biasing force therebetween.

3. A train of gears comprising a first gear, an intermediate gear assembly and a final gear, said intermediate gear assembly comprising a shaft, three gears, means mounting said three gears on said shaft in spaced side-by-side relation, said first gear meshing with the central gear and one of the outside gears of said intermediate gear assembly, said final gear meshing with the central and the other outside gear of said intermediate gear assembly, and means exerting a resilient force between the two outside gears of said intermediate gear assembly in a direction to urge said outside gears to relative rotation.

4. A train of gears comprising a first gear, an intermediate gear assembly and a final gear, said intermediate gear assembly comprising a shaft, three gears, means mounting said three gears on said shaft in spaced side-by-side relation, said first gear meshing with the central gear and one of the outside gears of said intermediate gear assembly, said final gear meshing with the central and the other outside gear of said intermediate gear assembly, a projection extending from each of said outside gears toward the other and passing through a common one of the spaces between the gears of said intermediate gear assembly and means connecting said projections, said connecting means exerting a resilient force therebetween.

5. A train of gears comprising a first gear, an intermediate gear assembly and a final gear, said intermediate gear assembly comprising a shaft, three gears, means mounting said three gears on said shaft in spaced side-by-side relation, the central gear of said three gears having two axially spaced toothed peripheral portions of different diameters, said first gear meshing with one of the outside gears and one of said peripheral portions of the central gear of said intermediate gear assembly and said final gear meshing with the other outside gear and the remaining peripheral portion of the central gear of said intermediate gear assembly, and means exerting a resilient force between the two outside gears of said intermediate gear assembly in a direction to urge said outside gears to relative rotation.

CHARLES W. CAIRNES.

No references cited.